United States Patent Office 3,189,144
Patented June 15, 1965

3,189,144
HYDROKINETIC TORQUE CONVERTER MECHA-
NISM WITH DUAL PERFORMANCE RANGE
Martin G. Gabriel, Dearborn, Mich., assignor to Ford
Motor Company, Dearborn, Mich., a corporation of
Delaware
Filed Nov. 5, 1962, Ser. No. 235,413
3 Claims. (Cl. 192—3.2)

My invention relates generally to hydrokinetic mechanisms and, more particularly, to improvements in hydrokinetic torque converters.

My invention can be embodied readily in hydrokinetic torque converters that have multiple turbines as well as those embodying a single turbine. Likewise, either a single bladed reactor member or multiple blade reactor members can be used as desired.

For purposes of my disclosure I will describe a torque converter mechanism having a single reactor and a single turbine. My improved construction includes also a main bladed impeller member and an auxiliary bladed impeller, the latter being located at the fluid flow exit section of the main impeller. Each of the impellers, the turbine and the reactor are situated in toroidal fluid flow relationship in the usual fashion. Provision is made for controlling the action of the auxiliary impeller so that the angle of entry of the fluid that enters the turbine entrance section can in turn be controlled. It thus is possible to control the direction of the absolute fluid flow velocity vectors at the turbine entrance section and at the exit section of the auxiliary impeller to provide high performance operation of the converter in the low speed ratio range and to provide maximum cruising efficiency after the converter reaches the coupling or cruising range. This characteristic will be more apparent from the decription of the hydrokinetics which appears in subsequent portions of this disclosure.

It is an object of my invention to provide a hydrokinetic torque converter having an auxiliary bladed impeller as well as a main bladed impeller wherein the auxiliary impeller may be caused to rotate either jointly with the main impeller or rotate freely in the torus circuit.

It is a further object of my invention to provide a hydrokinetic torque converter mechanism having an auxiliary bladed impeller and a main bladed impeller that are arranged to rotate either jointly or independently, and wherein the blades of the auxiliary impeller define a continuation of bladed fluid flow passages of the main impeller.

It is a further object of my invention to provide a hydrokinetic torque converter mechanism of the type above set forth wherein the geometry of the blading of the auxiliary impeller differs from the corresponding geometry of the adjacent portion of the blading of the main impeller so that the hydrokinetic characteristics of the torque converter mechanism are varied to provide either of two performance ranges depending upon whether the auxiliary impeller is active or inactive.

It is a further object of my invention to provide a hydrokinetic torque converter mechanism of the type above set forth wherein the blading of the auxiliary impeller is capable of changing the direction or magnitude of the absolute fluid flow velocity vector of the fluid leaving the exit section of the main impeller so that the tangential component of the absolute fluid flow velocity vector leaving the exit section of the auxiliary impeller in the direction of rotation of the turbine is increased when the auxiliary impeller is active relative to the corresponding velocity vector component that exists when the auxiliary impeller is inactive.

The structural features of my invention will become apparent from the following description and from the accompanying drawings, wherein.

Figure 1:
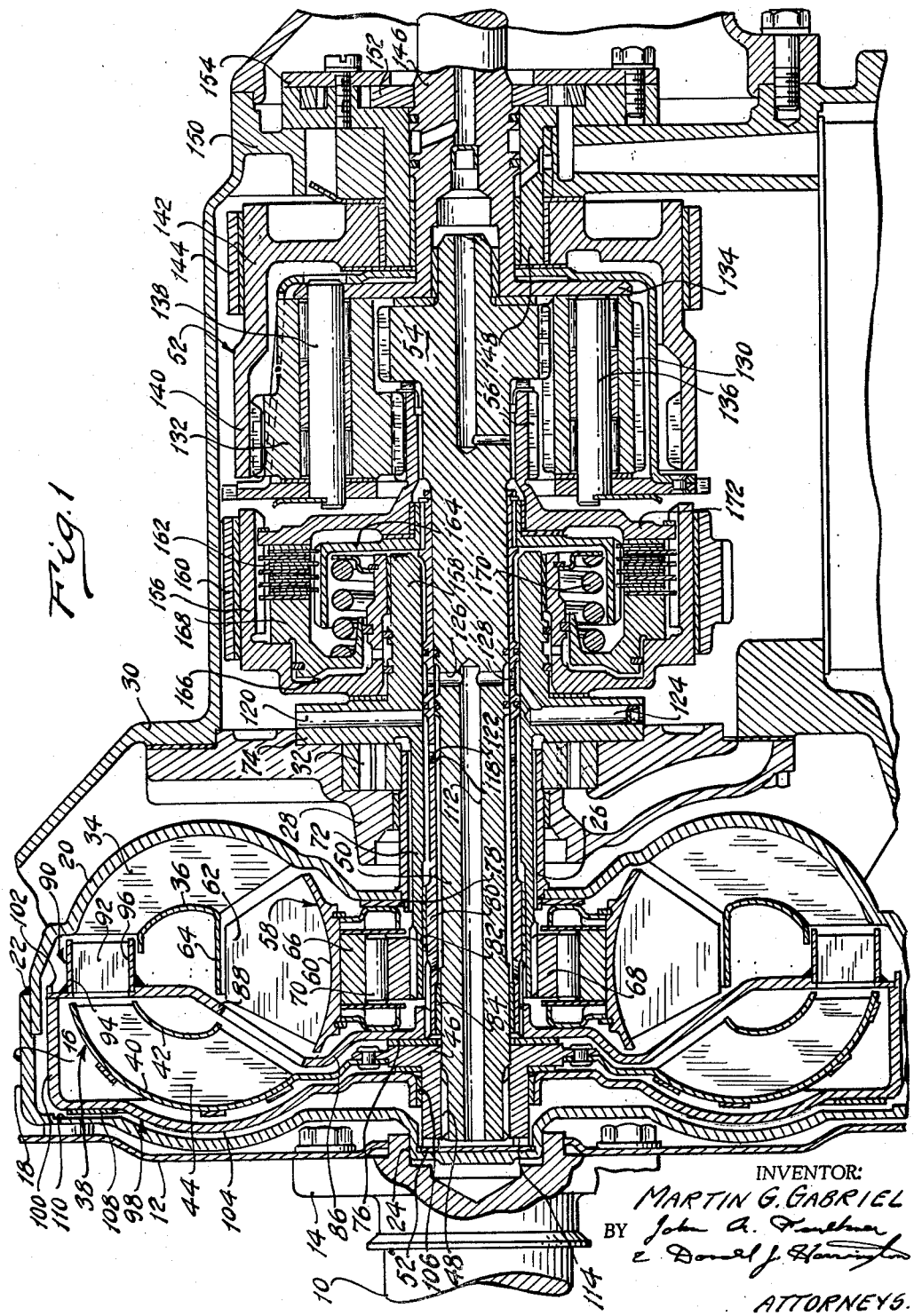
FIGURE 1 shows in cross sectional form my torque converter acting in combination with a multiple speed ratio torque delivery gear mechanism.

Referring first to FIGURE 1, I have illustrated a transmission mechanism embodying my improved torque converter. It is adapted to be used in the driveline of a wheeled automotive vehicle. Power input shaft 10 can be connected to a vehicle engine. This normally would be the engine crankshaft of a reciprocating piston engine. A drive plate 12 is bolted, as shown, to a flange 14 on the shaft 10. It is connected in turn to an impeller shell 16 having two parts separately identified by reference numerals 18 and 20. The outer peripheries of the parts 18 and 20 are welded at 22 to provide a unitary assembly. The radially inward hub portion of part 18 is received within a pilot recess 24 in the end of shaft 10.

The radially inward hub portion of part 20 is secured to a sleeve shaft 26 that is journaled within a transverse separating wall 28. This wall 28 is bolted at its outer periphery to a transmission housing designated by reference character 30. Wall 28 defines a cavity for a positive displacement pump identified by reference numeral 32. This pump may comprise a pumping rotor that can be drivably keyed or otherwise secured to shaft 26. The output pressure of the pump 32 may be used for supplying control pressure to the various clutch and brake elements of the transmission.

The impeller shell 16 is supported at both of its axial sides by the wall 28 and by the shaft 10. The impeller shell part 20 has received therein pump blades 34 that define fluid flow passages for the hydrokinetic fluid. The passages are defined in part by an inner shroud 36.

A turbine member is shown at 38. It includes an outer shroud 40, an inner shroud 42 and a plurality of blades 44. The blades 44 and the cooperating shrouds 40 and 42 define fluid flow passages in the usual fashion. The hub of the outer shroud 40 is riveted or otherwise positively secured to a hub 46 that in turn is splined at 48 to a turbine shaft 50. A suitable thrust bearing 52' is disposed between the end of shaft 50 and the adjacent portion of the hub of impeller shell part 18.

Shaft 50 extends through wall 28 to a compound planetary gear unit generally identified by reference character 52. Gear unit 52 includes a first sun gear 54 to which the shaft 50 is connected. A second sun gear, shown at 56, is of less pitch diameter than the pitch diameter of sun gear 54.

A torque converter reactor member is identified generally by reference character 58. It includes a hub 60 to which are radially extending blades 62. The inner shroud 36 can be formed with an extension 64 that overlies the outer periphery of the blades 62 thus defining a shroud for the latter. The hub 60 is formed with a cylindrical opening so that it is adapted to receive an overrunning brake comprising an outer race 66, an inner race 68 and roller clutch elements 70. One of the races for the overrunning brake can be cammed to provide cooperating cam surfaces for the roller 70. The reactor 58 thus can rotate freely in one direction, but the brake inhibits reverse rotation.

The inner race 68 can be splined to a sleeve 72 that in turn is carried by a stationary support member 74. The wall 28 supports the member 74 in a fixed position.

Suitable thrust washers 76 and 78 can be situated on either side of the reactor 58 to accommodate axial thrust forces.

A sleeve shaft 80 is received within the stationary shaft 72 and surrounds the turbine shaft 50. Suitable bushings 82 and 84 can be provided between the concentric shafting to support the shaft 80. An auxiliary impeller hub 86 is splined to sleeve shaft 80 and extends radially between the hub 46 for the turbine and the reactor hub 60. Outwardly extending fingers 88 are carried by the hub 86 and support at a radially outward position a bladed auxiliary impeller identified generally by reference character 90. This auxiliary impeller includes a plurality of spaced auxiliary pump blades 92, an outer shroud ring 94 and an inner shroud ring 96. The blades 92 are situated at the exit section of blades 34.

An auxiliary impeller clutch member is identified generally by reference character 98. It includes an outwardly disposed part 100 that preferably is keyed at 102 to the cooperating keyed flange on the outer shroud 94 of the auxiliary impeller 90. It includes also a portion 104 that extends radially inward. This part 104 is journaled on the hub 46 as shown in part at 106. A clutch disc 108 is carried by the outer region of the clutch part 104. This disc 108 is disposed in close adjacent proximity to a friction surface 110 formed on the interior of the impeller shell part 18.

It thus will be apparent that the shell part 18 and the clutch member 104 cooperate to define a pressure cavity therebetween. It will be apparent also that the clutch part 104 is exposed to circuit pressure. This pressure applies a force on the interior of the clutch part 104 and urges the latter in a left-hand direction as viewed in FIGURE 1. The clutch part 104 is designed to shift axially to a very slight degree. The shifting movement is sufficient to cause clutch disc 108 to become engaged frictionally with the clutch friction surface 110 thus establishing a frictional direct drive connection between the main impeller and the auxiliary impeller 90. This movement can be accomplished by allowing for relative motion at the keyed connection between the peripheral part 100 of the clutch member 98 and the cooperating flange of the auxiliary impeller shroud ring 94. It can be accomplished also, however, by allowing the extensions or fingers 88 to flex relative to the hub 86 thus allowing a slight shifting movement of the auxiliary impeller 90 and the cooperating clutch part 98. The extensions 88 form apertures as shown in FIGURE 1 to permit free fluid circulation in the torus circuit.

The cavity between the clutch part 104 and the inwardly extending portion of the impeller shell 18 is in fluid communication with a passage 112 formed in the turbine shaft 50. The hub 46 can be formed with recesses at the left axial end thereof, as viewed in FIGURE 1. These recesses are identified by reference character 114.

The torus circuit can be pressurized in the usual fashion by supplying fluid under pressure through the annular space surrounding sleeve shaft 72. Suitable return flow passage structure 120 can be formed in the support member 74 as indicated, said passage structure being in communication with the annular passage 118 through porting shown in part at 122. In a similar fashion, a parallel return flow or exhaust passage 124 can be formed in the support member 74 and this passage in turn can communicate with central passage 112 in the turbine shaft 50 through a radial passage 126 and a port 128 in the sleeve shaft 80.

It will be apparent from the foregoing that the pressure that exists in the chamber between the clutch part 104 and the impeller shell part 100 can be controlled by controlling the flow of fluid through passage 112 and passage 124. Suitable control valve structure, not shown, can be passage 112 is unrestricted, a pressure drop will occur across the annular space between the disc 108 and the adjacent friction surface 110. The clutch part 104 thus will be under the influence of only circuit pressure to cause frictional engagement between the disc 108 and the friction surface 110 thereby locking together the auxiliary impeller 90 with the main impeller. If, however, the passage 112 and the communicating passage 124 are restricted by a control valve mechanism, the pressure in the chamber defined by clutch part 104 and impeller shell part 18 will increase so that the pressure differential across the clutch member 98 will be balanced. Under these conditions the clutch disc 108 will move out of frictional engagement with the friction surface 110. If desired, a return spring can be provided between the clutch member 98 and the shell part 18. But in the embodiment disclosed, I rely upon the resiliency of the extensions 88 to disengage the friction disc 108.

The sun gear 54 engages a series of long planet pinions 130. These pinions in turn engage a series of short planet pinions 132. The pinions 130 and 132 are carried by a common carrier 134. Pinions 130 are mounted upon planet pinion shafts 136 and pinions 132 are mounted upon planet pinion shafts 138. A ring gear 140 drivably engages planet pinions 132. Planet pinions 132 also drivably engage the sun gears 54 and 56. The ring gear 140 has formed thereon an extension that defines a brake drum 142. A friction brake band 144 is situated about the drum. It is adapted to anchor selectively the drum 142 upon application of a cooperating brake servo.

The carrier 134 is connected drivably to a power output shaft 146 which is journaled within an adapter 148. An end wall 150 supports the adapter 148.

A power output shaft driven pump 152 is keyed or otherwise drivably connected to shaft 146 and is housed within the cavity formed in the adapter 148. A pump cover plate 154 cooperates with this recess to define a pump chamber within which the pump elements are situated. This pump 152 can provide circuit pressure in conjunction with the pressure supplied by pump 32 and thus serves as a source of pressure for an automatic control circuit, not shown.

A brake drum 156 is journaled upon an extension 158 of the support member 74. A friction brake band 160 surrounds the drum 156, and it may be applied to anchor the drum upon application of a cooperating fluid pressure operated brake servo.

The interior of drum 156 is internally splined to permit a driving connection between externally splined clutch discs of a multiple disc clutch assembly 162. Internally splined clutch discs of the assembly 162 are carried by an externally splined clutch member 164 which in turn is keyed or splined to sleeve shaft 80. Drum 156 also defines an annular clutch servo cylinder 166 within which is positioned clutch servo piston 168. The piston 168 normally is urged in a left-hand clutch releasing position by a clutch return spring 170.

A clutch plate back-up member is shown at 172. It is splined to the internal splines of the brake drum 156 and held against axial movement by a cooperating snap ring. This member 172 is connected to the small sun gear 56.

It thus is apparent that the transmission mechanism of FIGURE 1 is capable of providing two forward driving speed ratios and a reverse ratio. Reverse ratio can be accomplished by engaging brake band 144. Engine torque then delivered to the main impeller is multiplied by the hydrokinetic torque converter mechanism and the resulting turbine torque is transferred to turbine shaft 50 and to the small sun gear 54. Since the ring gear 140 is held stationary by brake band 144, the carrier 134 and the power output shaft 146 are driven in a reverse direction relative to the direction of rotation of shaft 50.

To accomplish low speed ratio forward drive operation, brake band 160 is applied. This anchors sun gear 56. The turbine torque delivered to sun gear 54 then causes provided for this purpose. If the flow of fluid through the carrier to rotate about the stationary sun gear 56 in a forward direction. This forward motion, of course, is transferred to the power output shaft 146 at a reduced speed ratio.

To obtain a direct drive condition in the cruise range, the auxiliary impeller clutch is applied and the direct drive multiple disc clutch assembly 162 is applied. A split torque drive arrangement thus is accomplished with a portion of the engine torque being delivered to the sun gear 56 and with turbine torque being delivered to the sun gear 54.

If low speed operation is desired in the cruise range, the multiple disc clutch assembly 162 is disengaged and the auxiliary impeller clutch remains applied. Also, the brake band 160 is applied. Of course, acceleration in the high performance range can be accomplished merely by disengaging the auxiliary impeller clutch while the brake band 160 is applied and the clutch assembly 162 remains disengaged.

Figure 3:
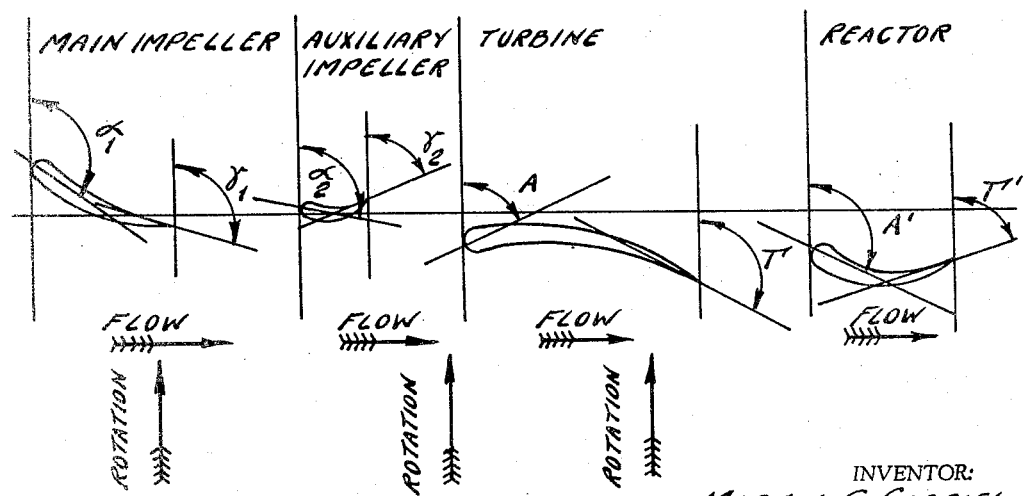
FIGURE 3 is a schematic illustration of the blade relationships of the main impeller, the auxiliary impeller, the turbine and the reactor of my torque converter.

Referring next to FIGURE 3, I have illustrated a blade cascade that represents the relationship of the torque converter blading with respect to a particle of fluid that is flowing through the torus circuit in the direction of the fluid flow vector marked "flow." The main impeller entrance angle is designated by the symbol "$\alpha_1$" and the exit angle for the main impeller blades is designated by the symbol "$\gamma_1$." The entrance angle for the auxiliary impeller is designated by the symbol "$\alpha_2$" and the corresponding exit angle is represented by the symbol "$\gamma_2$." For the turbine, the entrance angle is designated by the symbol "A" and the exit angle is represented by the symbol "Γ." The reactor entrance angle is represented by the symbol "A'" and the reactor exit angle is represented by the symbol "Γ'."

By preference, the exit angle $\alpha_1$ of the main impeller is greater than 90° so that the blade exit section of the main impeller extends in a direction opposite to the direction of rotation. In one operating embodiment of my invention that is used in cooperation with a 260 cu. in. displacement internal combustion engine, the angle $\alpha_1$ is approximately 120°. In contrast, the exit angle $\alpha_2$ for the auxiliary impeller in this operating embodiment of my invention is approximately 70° and the entrance angle $\alpha_2$ for the auxiliary impeller is approximately 110°. Thus, it is apparent that the auxiliary impeller, when it is rotating jointly with the main impeller, is effective to reverse the direction of rotation of the relative fluid flow velocity vector as the fluid flows from the entrance section of the main impeller to the exit section of the auxiliary impeller. If the auxiliary impeller rotates freely with its clutch disengaged, the direction of the relative fluid flow velocity vector will be opposite to the direction of rotation. Under these conditions, the torque ratio of the converter mechanism is increased as well as the torque converter size factor. (The torque ratio is defined as the ratio of the turbine torque to the impeller torque and the size factor is defined as the impeller speed divided by the square root of the impeller torque). Operation of the transmission mechanism under these conditions will result in a magnified torque output that is delivered to the traction wheels of the vehicle.

The blade geometry of the main impeller does not contribute to maximum coupling efficiency. During operation in the coupling range, however, optimum cruise performance can be obtained by engaging the auxiliary impeller clutch, thereby reversing the direction of the relative fluid flow velocity vector for the fluid that passes through the two impellers with respect to the direction of rotation.

Figure 2:
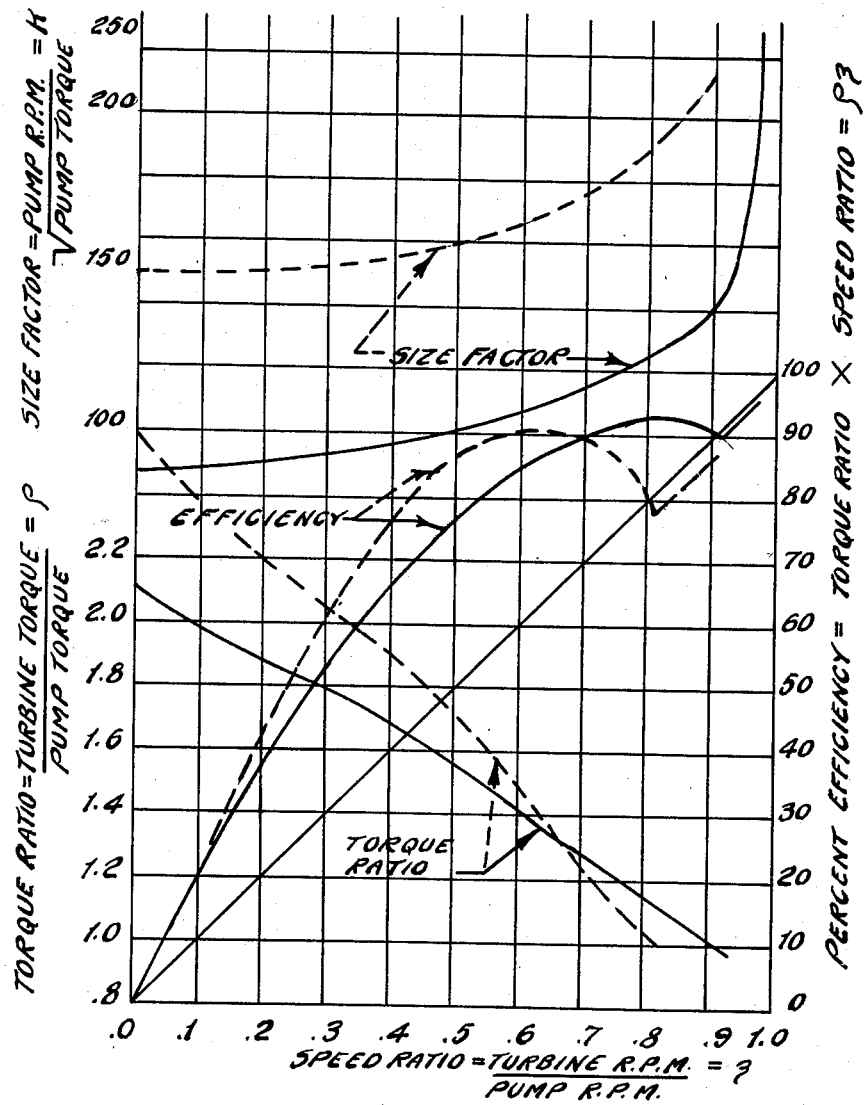
FIGURE 2 shows a performance chart for my improved torque converter when it is operated in both the high performance range and the cruising range.

The performance characteristics of the torque converter in both the high performance range and the cruise range are illustrated graphically in FIGURE 2. The full line illustration of the efficiency, the torque ratio and the size factor represents the cruising performance condition and the dashed efficiency, torque ratio and size factor curves represent the high performance range condition.

Figure 4:
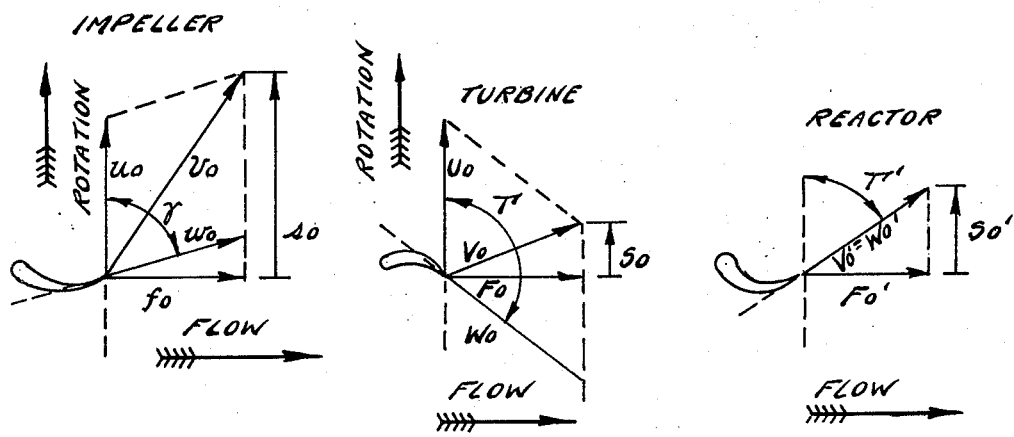
FIGURE 4 shows vector diagrams describing the motion of a particle of fluid at the exit section of the bladed members of my torque converter.

In order to explain the hydrokinetics that are involved, reference will be made to the accompanying FIGURE 4. For simplicity, however, the impeller blades that are shown in FIGURE 4 illustrate only a general case; e.g., a single stage impeller. As previously explained, the tangential component of the absolute fluid flow velocity vector at the exit section of the impeller is changed in magnitude by the auxiliary impeller. The following discussion, however, will explain how this action of the auxiliary impeller in turn influences the torque ratio curve, the efficiency curve and the size factor curve of FIGURE 2. Thus, a velocity vector diagram for the main impeller only is shown in FIGURE 4.

The torque that acts upon the reactor is in a direction opposite to the direction of the torque acting upon the turbine. The magnitude of this negative torque reaction, however, is equal to the moment of momentum of the fluid that leaves the exit section of the reactor minus the moment of momentum of the fluid that enters the inlet section of the reactor.

Since the moment of momentum at the exit section of the impeller is equal to the moment of momentum at the inlet section of the turbine, the turbine torque then can be expressed as the difference between the moment of momentum at the exit section of the turbine and the moment of momentum at the exit section of the impeller. Similarly, the impeller torque can be expressed as the difference between the moment of momentum of the fluid at the impeller exit minus the moment of momentum of fluid at the reactor exit. This is true since the moment of momentum at the reactor exit equals the moment of momentum at the impeller inlet.

Expressions for impeller torque and turbine torque can be obtained by computing analytically the values for the moment of momentum of a particle of fluid as it traverses the torus circuit at each of the critical blade sections. This can be done independently of the inlet blade geometry of the converter members. The moment of momentum is defined as the mass of that particle of fluid times its operating radius times the tangential component of the absolute fluid flow velocity vector for that particle.

It is necessary to express analytically the tangential component of the absolute fluid flow velocity vector at each of the blade exit sections. These vectors are illustrated in FIGURE 4. The symbols $\gamma$, Γ and Γ' represent respectively the impeller blade exit angle, the turbine blade exit angle and the reactor blade exit angle. In the case of the turbine, the velocity vector ($S_0$) is equal to the quantity $U_0 + F_0$ Cot Γ. Similarly, the corresponding expression for the impeller ($s_0$) is equal to $u_0 + f_0$ Cot $\gamma$. Also, the tangential component of the absolute fluid flow velocity vector ($S_0'$) at the reactor exit section is equal to $F_0'$ Cot Γ'.

The quantity $u_0$ is a function of the radius of the impeller exit and the impeller speed. Similarly, the quantity $U_0$ is a function of the radius of the turbine exit section and the turbine speed.

The torque ratio $\rho$ of the converter under any given operating condition is equal to $T/t$. This can be expressed as follows:

(a) $$\rho = \frac{T}{t} = 1 + \frac{T'}{t}$$

where $T$ = turbine torque and $t$ = impeller torque $T'$ = reactor torque (b)
$$\rho = \frac{\text{moment of momentum at turbine exit} - \text{moment of momentum at impeller exit}}{\text{moment of momentum at impeller exit} - \text{moment of momentum at reactor exit}}$$

$$= \frac{M_0 R_0 S_0 - m_0 r_0 s_0}{m_0 r_0 s_0 - M_0' R_0' S_0'}$$

(since $m_0 = M_0 = M_0' =$ mass flow of particle of fluid at various stages measured in slugs per sec.)

where $R_0 =$ radius of particle of fluid at turbine exit $r_0 =$ radius of particle of fluid at impeller exit $R_0' =$ radius of particle of fluid at reactor exit $$= \frac{m_0 R_0 (U_0 + F_0 \cot \Gamma) - m_0 r_0 (u_0 + f_0 \cot \gamma)}{m_0 r_0 (U_0 + f_0 \cot \gamma) - m_0 R_0' F_0' \cot \Gamma'}$$

where $F_0 =$ torus flow at turbine exit $f_0 =$ torus flow at impeller exit $F_0' =$ torus flow at reactor exit It is apparent therefore that if the quantity $\gamma$ (impeller exit angle) were to be increased, the expression for impeller torque would be decreased in value. Similarly, the expression for turbine torque would be increased in value if the quantity $\gamma$ were to increase.

As previously indicated, the characteristics of the converter must be matched with the speed-torque characteristics of the engine. In order to correlate the two, a so-called size factor for the engine is computed and compared with the corresponding size factor for the converter. The size factor for the converter is a measure of its torque transmitting capacity. It can be expressed as the quantity $$K = \frac{n}{\sqrt{t}} = \frac{60\omega}{2\pi\sqrt{t}} = \frac{9.5493\omega}{\sqrt{t}}$$

where $n =$ impeller speed and $\omega =$ angular velocity.

By making use of the prior expressions for impeller torque and turbine torque, this size factor can be expressed in terms of the converter exit geometry. This analysis follows:

(c) $\quad \rho = \frac{-T}{t} = \frac{-(M_0 R_0 S_0 - m_0 r_0 s_0)}{m_0 r_0 s_0 - M_0' R_0' S_0'}$ (d) $\quad -\rho = \frac{R_0 S_0 - r_0 s_0}{r_0 s_0 - R_0' S_0'}$ if $M_0 = m_0 = M_0'$ (e) $\quad (\rho - 1) r_0 s_0 + R_0 S_0 - \rho R_0' S_0' = 0$ but, $s_0 = \omega r_0 + f_0 \cot \gamma$ $S_0 = \eta \omega R_0 + F_0 \cot \Gamma$ $\quad = \eta \omega R_0 + \frac{l_0 f_0}{L_0} \cot \Gamma$ and $S_0' = F_0' \cot \Gamma' = \frac{l_0 f_0}{L_0'} \cot \Gamma'$ where $l_0 =$ cross sectional area at impeller exit $L_0 =$ cross sectional area at turbine exit $L_0' =$ cross sectional area at reactor exit $\eta =$ speed ratio $\omega =$ angular velocity in radians/sec.

(f)
$$\therefore f_0 \left[ (\rho - 1) r_0 \cot \gamma + R_0 \frac{l_0}{L_0} \cot \Gamma - \rho R_0' \frac{l_0}{L_0'} \cot \Gamma' \right]$$
$$= [-(\rho - 1) r_0^2 \eta R_0^2] \omega$$

(g)
$$f_0 = \left[ \frac{(\rho - 1) r_0^2 + \eta R_0^2}{\rho R_0' \frac{l_0}{L_0'} \cot \Gamma' - (\rho - 1) r_0 \cot \gamma - R_0 \frac{l_0}{L_0} \cot \Gamma} \right] \omega = A\omega$$

(h)
$$K = \frac{9.5493\omega}{\sqrt{t}}$$

$$= \frac{9.5493\omega}{\sqrt{m_0 r_0 s_0 - M_0' R_0' S_0'}}$$

$$= \frac{9.5493\omega}{\sqrt{m_0 \left[ r_0 (\omega r_0 + A\omega \cot \gamma) - R_0' \frac{l_0}{L_0'} A\omega \cot \Gamma' \right]}}$$

It will be apparent from the expression (h) for size factor that if the angle of the fluid flow vector relative to the exit section of the impeller blade were to decrease, the value of K would decrease. This is exactly what happens when the auxiliary impeller is clutched to the main impeller. As seen in FIGURE 3, the effective impeller exit angle is decreased from the value $\Gamma_1$ to the value $\Gamma_2$. It thus is apparent that if the auxiliary impeller is caused to flow freely in this torus circuit, the effective exit angle of the impeller will increase and this will result in an increase in the torque ratio at the lower speed ratios. This, of course, results in increased performance during initial acceleration of the vehicle although the cruising efficiency at higher speed ratios is less than the optimum value. Cruising efficiency can be restored, however, merely by engaging the auxiliary impeller clutch as previously explained.

Having thus described the principal features of my invention, what I claim and desire to secure by United States Letters Patent is:

1. A hydrokinetic mechanism comprising a driving member, a bladed main impeller, a bladed auxiliary impeller and a bladed turbine disposed in toroidal fluid flow relationship, in a common torus circuit, each impeller having a flow entrance section and a flow exit section, the fluid flow exit section of said main impeller being located at a radially outward region of the circuit, said auxiliary impeller being disposed adjacent the exit section of said main impeller, the blades of the main impeller and the blades of the auxiliary impeller defining fluid flow paths, the motion of a particle of fluid at any point in said circuit being defined by both an absolute flow velocity vector and a velocity vector representing flow relative to bladed portions of said mechanism, said vectors defining an included angle when they are extended from a given point in said circuit, one path being a continuation of the other, the included angle between the tangential component of the absolute flow velocity vector for a particle of fluid at the exit section of the main impeller and the velocity vector for that particle of fluid extending in the direction of the main impeller exit angle being greater than the angle between the corresponding vectors at the exit section of the auxiliary impeller, said main impeller comprising an impeller shell, means for drivably connecting said impeller shell to said driving member, a clutch member disposed within said shell and connected to said auxiliary impeller, a first annular friction clutch surface carried by said clutch member, a second annular friction clutch surface carried by said shell adjacent said first surface and in close proximity thereto, a fluid feed passage means communicating with said circuit for supplying hydrodynamic fluid thereto, fluid flow return passage means extending from said circuit including a portion defined in part by the space between said shell and said clutch member, said clutch member being actuated to a friction surface engaging position when the pressure in said portion of said flow return passage means is less than the pressure of the fluid in said circuit.

2. A hydrokinetic mechanism comprising a driving member, a bladed main impeller, a bladed auxiliary impeller and a bladed turbine disposed in toroidal fluid flow relationship in a closed toroidal circuit, each impeller having a flow exit section and a flow entrance section, the fluid flow exit section of said main impeller being located at a radially outward region of the circuit, said auxiliary impeller being disposed adjacent to the exit section of said main impeller, the blades of said main impeller and the blades of said auxiliary impeller defining fluid flow paths, the motion of a particle of fluid at any point in said circuit being defined by both an absolute flow velocity vector and a velocity vector representing flow relative to bladed portions of said mechanism, said vectors defining an included angle when they are extended from a given point in said circuit, one path being a continuation of the other, the included angle between the tangential component of the absolute flow velocity vector for a particle of fluid at the exit section of the main impeller and the velocity vector for that particle of fluid extending in the direction of the main impeller exit angle being greater than the angle between the corresponding vcetors at the exit section of the auxiliary impeller, said main impeller comprising an impeller shell, means for drivably connecting said impeller shell to said driving member, a clutch member disposed within said shell and connected to said auxiliary impeller, means for establishing a driving connection between said clutch member and said shell, said shell defining in part a first friction surface, a second friction surface carried by said clutch member, said friction surfaces being situated normally in adjacent relationship, one side of said clutch member being exposed to the circuit pressure within said torus circuit whereby a clutch applying force is applied to said friction surfaces to establish a frictional driving connection between said main impeller and said auxiliary impeller, said clutch member including a portion extending radially inwardly from said radially outward region to a radially inward location, said clutch mmeber portion being disposed between said impeller shell and said turbine and cooperating with said impeller shell to define a pressure cavity located radially inwardly of said friction surfaces, a fluid feed passage means communicating with said circuit for supplying hydrodynamic fluid thereto, fluid flow return passage means including a portion defined in part by said pressure cavity, said clutch member being actuated into clutching engagement with said impeller shell when the fluid pressure in said flow return passage means portion is lower than the fluid presure in said circuit.

3. A hydrokinetic mechanism comprising a driving member, a bladed main impeller, a bladed auxiliary impeller and a bladed turbine disposed in toroidal fluid flow relationship in a common torus circuit, each impeller having a flow entrance section and a flow exit section, the fluid flow exit section of said main impeller being located at a radially outward region of the circuit, said auxiliary impeller being disposed adjacent the exit section of said main impeller, the blades of the main impeller and the blades of the auxiliary impeller defining fluid flow paths, the motion of a particle of fluid at any point in said circuit being defined by both an absolute flow velocity vector and a velocity vector representing flow relative to bladed portions of said mechanism, said vectors defining an included angle when they are extended from a given point in said circuit, one path being a continuation of the other, the included angle between the tangential component of the absolute flow velocity vector for a particle of fluid at the exit section of the main impeller and the velocity vector for that particle of fluid extending in the direction of the main impeller exit angle being greater than the angle between the corresponding vectors at the exit section of the auxiliary impeller, said main impeller comprising an impeller shell, means for drivably connecting said impeller shell to said driving member, a clutch member disposed within said shell and connected to said auxiliary impeller, a first annular friction clutch surface carried by said clutch member, a second annular friction clutch surface carried by said shell adjacent said first surface and in close proximity thereto, a fluid feed passage means communicating with said circuit for supplying hydrodynamic fluid thereto, fluid flow return passage means extending from said circuit including a portion defined in part by the space between said shell and said clutch member, said clutch member being actuated to a friction surface engaging position when the pressure in said portion of said flow return passage means is less than the pressure of the fluid in said circuit, said friction surfaces defining therebetween an annular fluid flow passage for accommodating radial fluid flow from said circuit to said return passage means portion, said annular passage creating a pressure drop by reason of said radial fluid flow when said friction surfaces are disengaged thereby creating a pressure differential across said clutch member that tends to urge said friction surfaces together, said friction surfaces interrupting said radial fluid flow when they are engaged.

References Cited by the Examiner
UNITED STATES PATENTS

| | | | |
|---|---|---|---|
| 2,603,943 | 7/52 | Evernden | 60—54 |
| 2,737,061 | 3/56 | Kelley | 60—54 |
| 3,009,368 | 11/61 | Lorean | 74—677 |
| 3,043,161 | 7/62 | Tuck | 60—54 |
| 3,079,756 | 3/63 | Farrell | 60—54 |
| 3,103,831 | 9/63 | Corte et al. | 74—677 |

DAVID J. WILLIAMOWSKY, *Primary Examiner.*